United States Patent [19]
Greene, Jr.

[11] 3,866,621
[45] Feb. 18, 1975

[54] PROPORTIONING PUMP
[75] Inventor: George J. Greene, Jr., Houston, Tex.
[73] Assignee: Greene Research Engineering, Co., Houston, Tex.
[22] Filed: Oct. 23, 1973
[21] Appl. No.: 408,853

Related U.S. Application Data
[63] Continuation of Ser. No. 165,156, July 22, 1971, abandoned.

[52] U.S. Cl. .................................. 137/99, 137/551
[51] Int. Cl. ........................................... G05d 11/02
[58] Field of Search ...................... 137/98, 99, 551

[56] References Cited
UNITED STATES PATENTS
| | | | |
|---|---|---|---|
| 2,610,643 | 9/1952 | Goff | 137/99 |
| 2,837,105 | 6/1958 | Henke | 137/99 |
| 3,010,404 | 11/1961 | Anderson | 137/99 X |

Primary Examiner—William R. Cline
Attorney, Agent, or Firm—Jack R. Springgate; Joe E. Edwards; M. H. Gay

[57] ABSTRACT

A proportioning pump adapted to pump a liquid in proportion to the flow of liquid stream, such as for the injection of chemicals in the stream, and being driven by a meter which measures and registers the liquid flow of such stream.

4 Claims, 2 Drawing Figures

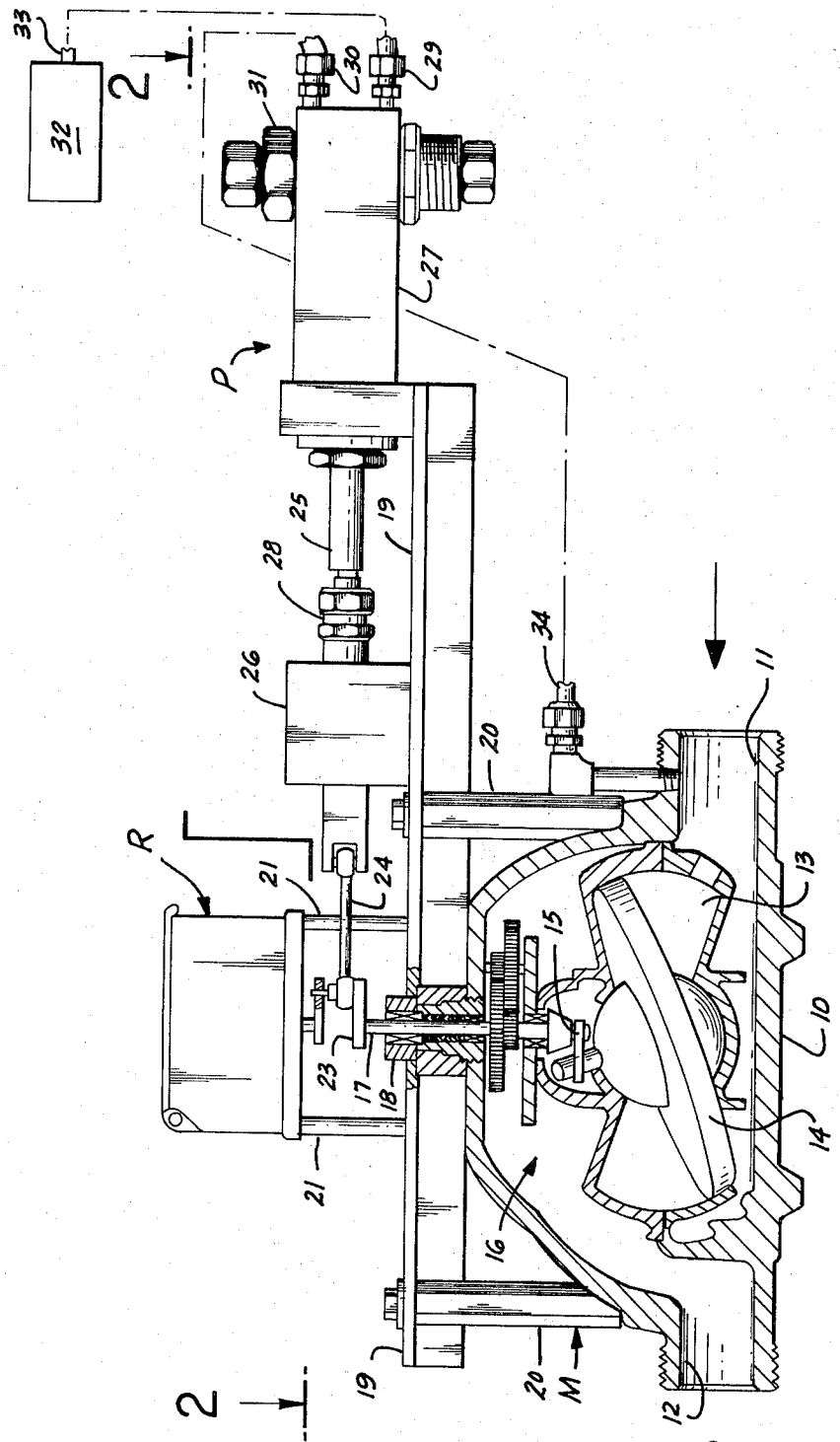

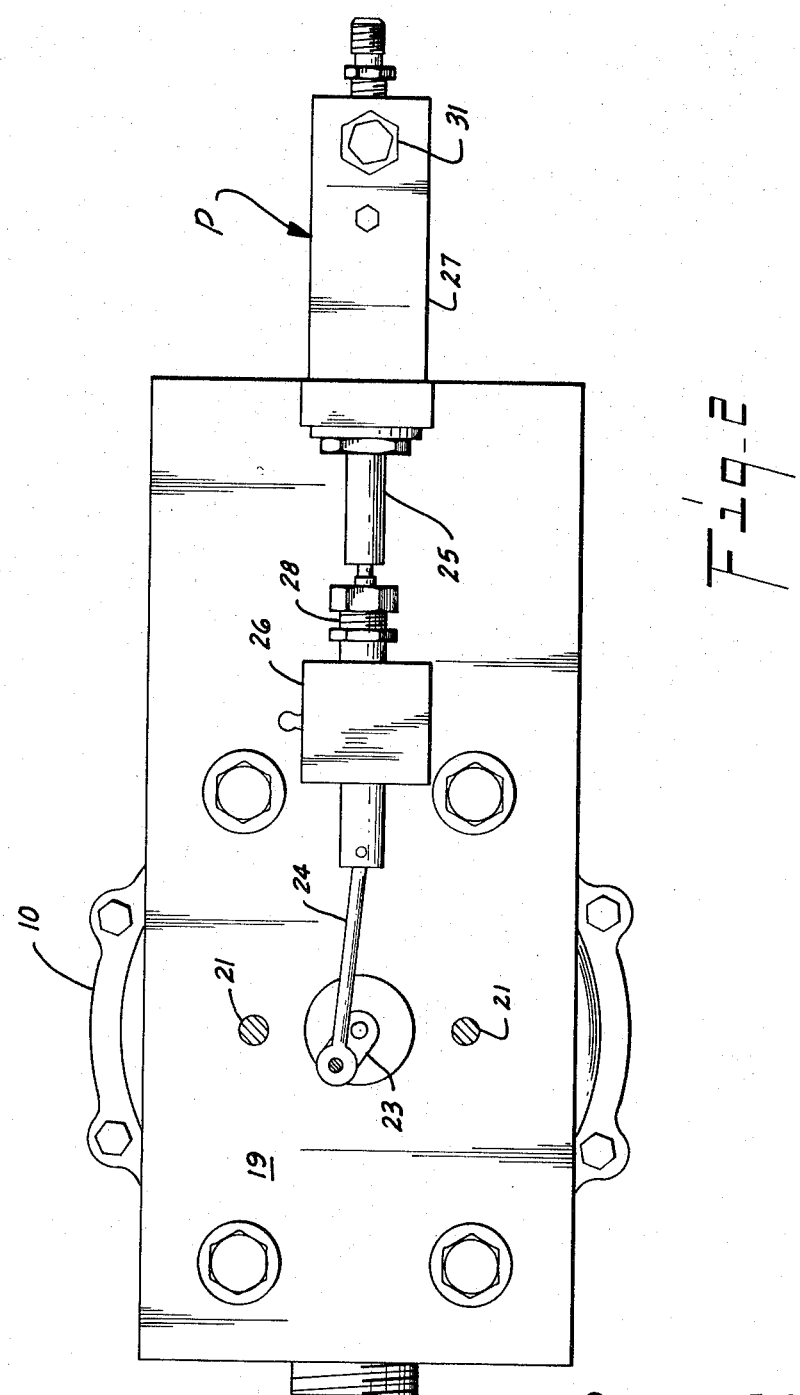

PROPORTIONING PUMP

This is a continuation of application Ser. No. 165,156, filed July 22, 1971, now abandoned.

This abstract is neither intended to define the invention of the application which, of course, is measured by the claims, nor is it intended to be limiting as to the scope of the invention in any way.

SUMMARY

The present invention relates to an improved proportioning pump.

In the handling of liquid streams it is often desirable to inject liquids into the stream. In such situations it is normally preferred that the amount of liquids injected be proportional to the amount of liquid flowing in the stream.

An object of the present invention is to provide an improved proportioning pump which is driven by a meter measuring and registering the flow of the stream to which the pump output is to be proportional.

Another object is to provide an improved proportioning pump which is driven by a liquid meter without the addition of other power.

A further object is to provide an improved proportioning pump driven by a liquid displacement meter without adversely affecting the accuracy of the liquid measurement on the meter register.

These and other objects of the present invention are hereinafter described and explained with respect to the drawings wherein:

FIG. 1 is an elevation view of the improved proportioning pump of the present invention with the meter drive being shown in cross section.

FIG. 2 is a plan view of the pump shown in FIG. 1 taken along line 2—2 in FIG. 1 to illustrate the pump driving means.

DESCRIPTION OF THE PREFERRED EMBODIMENT

The proportioning pump of the present invention as shown in the drawings includes the meter M, the meter register R, the plunger pump P and the means for driving the pump P responsive to flow through the meter M.

The meter M includes the housing 10 which has an inlet 11, an outlet 12, and a metering chamber 13 in communication between the inlet 11 and the outlet 12 and the piston 14 which is movable in the metering chamber 13 responsive to the flow of liquid therethrough. The movement of piston 14 is transmitted through roller 15 and gear train 16 to the shaft 17 which extends through the housing 10. The shaft 17 is supported with suitable seals in the bearings 18 for rotation responsive to the flow of liquid through the metering chamber 13. Meter M illustrated is a nutating disc type of positive displacement meter.

The meter M may be any suitable meter modified to have the shaft 17 extending from the housing and also having a gear train 16 preselected to drive the shaft 17 at a rate suitable for use in driving the pump P.

The pump P and the register R are mounted on the base 19 which is supported from the meter housing 10 by the supports 20. The register R is a standard meter register modified to record flow through the meter M by its connection to the shaft 17. Since the rotation of shaft 17 has been changed to drive the pump P, the register R is modified to accept the input of shaft 17 and provide a record of the liquid flow through meter M. The register R is supported above the base 19 by the legs 21 and has its input shaft 22 in alignment with and connected to the meter output shaft 17 by crank 23.

The means for driving the pump P includes the crank 23 which is driven by shaft 17, the connecting rod 24 which connects from the crank 23 to the plunger 25 and the cross head 26 through which the plunger 25 reciprocates. Such driving means translates the rotation of shaft 17 to the reciprocation of the plunger 25 within the pump barrel 27. The plunger 25 includes the stroke adjusting means 28 which provides a substantial variation in the output of pump P by varying the effective stroke of the plunger 25 within the pump barrel 27. Pump P having a reciprocating plunger as mentioned is a positive displacement pump.

The pump P is preferably similar to the pump disclosed in my copending application Ser. No. 95,438, filed Dec. 7, 1970. Pump P includes the barrel 27, the plunger 25 adapted to reciprocate within the bore in barrel 27, the inlet fitting 29, the outlet fitting 30 and the valve cartridge 31. Liquid from the reservoir 32 is supplied to pump P through line 33 and inlet fitting 29. The liquid discharged from pump P flows through the outlet fitting 30 and line 34 into the inlet 11 of the meter M. By injecting the liquid into the liquid flowing into the inlet 11 of meter M, the two liquids are mixed in passing through the meter M.

Since the rotation of shaft 17 is directly proportional to the liquid flow through the meter M and the plunger 25 reciprocates responsive to the rotation of shaft 17, the rate of injection of liquid by pump P is directly proportional to the rate of liquid flow through meter M. It has been found that driving of the injection pump P from the meter M does not require excessive power but can be accomplished with a pressure drop of two pounds per square inch across the meter. This driving of the pump P does not sacrifice the recording of the flow through the meter M as the register is mounted to be driven by the crank 23 and provide a register of the flow through the meter M. Further, register R functions to provide a bearing (not shown) for crank 23 to assure smooth operation of the pumping.

From the foregoing, it can be seen that the improved proportioning pump is driven by a meter without sacrifice of the meter reading, without creating excessive pressure losses to the liquid flowing through the meter and without the use of supplemental power. By driving the proportioning pump directly from a positive displacement meter, the rate of liquid injection is maintained substantially directly proportional to the rate of liquid flow through the meter.

What is claimed is:

1. A proportioning pump comprising:
    a pump barrel having a bore therein and an inlet and outlet communicating with said bore,
    a plunger positioned for reciprocation in said bore,
    valving controlling said inlet and outlet so that liquid is pumped by reciprocation of said plunger,
    a positive displacement liquid meter having a housing, and inlet, and outlet, a piston movable therein responsive to liquid flow therethrough, and a shaft driven responsive to movement of said piston, said shaft extending through said housing,
    eccentric means directly connecting said plunger to said shaft for reciprocating said plunger responsive to rotation of said shaft, a register having a rotary input shaft, a base mounted on said housing, said base supporting said register so that said input shaft is in alignment with said shaft driven responsive to movement of said piston and also supporting said pump barrel and said plunger in operative relation to said eccentric means, and means connecting said shafts whereby said register is actuated responsive to flow of liquid through said meter.

2. The apparatus recited in claim 1 wherein said eccentric and shaft connecting means comprises:

a crank connected to said piston driven shaft at one end and to said register input shaft at the other end so that rotation of said piston driven shaft is transmitted to said register, and a connecting rod connecting said plunger and said crank.

3. The apparatus recited in claim 2 including a cross head mounted on said base and adapted to receive said plunger to assure aligned reciprocation thereof responsive to rotation of said crank.

4. The apparatus recited in claim 1 wherein said piston driven shaft extends through said base and including means supporting said register in spaced relation to said base.

* * * * *